(12) United States Patent
Wu (10) Patent No.: US 11,984,991 B2
(45) Date of Patent: May 14, 2024

(54) SYSTEM INFORMATION RECEIVING METHOD, SYSTEM INFORMATION SENDING METHOD, AND DEVICE

(71) Applicant: VIVO MOBILE COMMUNICATION CO., LTD., Guangdong (CN)

(72) Inventor: Yumin Wu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 419 days.

(21) Appl. No.: 17/345,441

(22) Filed: Jun. 11, 2021

(65) Prior Publication Data

US 2021/0306108 A1    Sep. 30, 2021

Related U.S. Application Data

(63) Continuation of application No. PCT/CN2019/121229, filed on Nov. 27, 2019.

(30) Foreign Application Priority Data

Dec. 14, 2018  (CN) .......................... 201811535351.7

(51) Int. Cl.
*H04W 76/11*   (2018.01)
*H04L 1/1812*  (2023.01)
*H04W 72/23*   (2023.01)

(52) U.S. Cl.
CPC ........... *H04L 1/1819* (2013.01); *H04W 72/23* (2023.01); *H04W 76/11* (2018.02)

(58) Field of Classification Search
CPC .............................. H04W 72/23; H04W 76/11

USPC ........................................................ 370/329
See application file for complete search history.

(56) References Cited

U.S. PATENT DOCUMENTS

| 2015/0029972 | A1 | 1/2015 | Park et al. |
| 2016/0050593 | A1 | 2/2016 | Narasimha et al. |
| 2016/0192331 | A1 | 6/2016 | Liang et al. |

FOREIGN PATENT DOCUMENTS

| CN | 102804846 A | 11/2012 |
| CN | 104349460 A | 2/2015 |
| CN | 107888353 A | 4/2018 |
| CN | 108111281 A | 6/2018 |
| WO | WO-2013138019 A1 | 9/2013 |
| WO | WO-2015140601 A1 | 9/2015 |
| WO | WO-2018129547 A1 | 7/2018 |

OTHER PUBLICATIONS

International Search Report and Written Opinion of the International Searching Authority regarding International Patent Application No. PCT/CN2019/121229, dated Feb. 6, 2020. Translation provided by Bohui Intellectual Property.
"Corrections to Initial Access DL Channels and Signals," Intel Corp., 3GPP TSG RAN WG1 Meeting #94, R1-1808664, Aug. 24, 2018.

(Continued)

*Primary Examiner* — Angel T Brockman
(74) *Attorney, Agent, or Firm* — Harness, Dickey & Pierce, P.L.C.

(57) ABSTRACT

A system information receiving method includes: determining first configuration information, where the first configuration information is used to indicate HARQ processes for receiving different system information; and receiving different system information through corresponding HARQ processes according to the first configuration information.

19 Claims, 5 Drawing Sheets

(56) References Cited

OTHER PUBLICATIONS

"Summary of Other System Information Delivery," Samsung, 3GPP TSG RAN WG1 Meeting #94, R1-1809714, Aug. 24, 2018.
"Reply LS on Overlapping SIB1 and SI messages," Intel, 3GPP TSG RAN WG1 Meeting #94, R1-1808650, Aug. 24, 2018.
First Office Action regarding Chinese Patent Application No. 201811535351.7, dated Oct. 30, 2020. Translation provided by Bohui Intellectual Property.
Supplementary European Search Report regarding International Patent Application No. 19896437.1-1205/3896882; PCT/CN2019/121229, dated Jan. 4, 2022.

SYSTEM INFORMATION RECEIVING METHOD, SYSTEM INFORMATION SENDING METHOD, AND DEVICE

CROSS-REFERENCE OF RELATED APPLICATIONS

This application is a Bypass Continuation Application of PCT/CN2019/121229, filed on Nov. 27, 2019, which claims priority to Chinese Patent Application No. 201811535351.7 filed on Dec. 14, 2018, which are incorporated herein by reference in their entirety.

TECHNICAL FIELD

The embodiments of the present disclosure relate to the field of communications technologies, and specifically, to a system information receiving method, a system information sending method, and a device.

BACKGROUND

In a fifth-generation (5G) new radio (NR) system, system information includes: a master information block (MIB), a system information block 1 (SIB1) and other system information (SI). One piece of system information can include multiple system information blocks (SIB), for example: a system information block 2 (SIB2) and a system information block 3 (SIB3).

SUMMARY

According to a first aspect of the embodiments of the present disclosure, a system information receiving method is provided, applied to a receive side. The method includes:
 determining first configuration information, where the first configuration information is used to indicate hybrid automatic repeat request (HARQ) processes for receiving different system information; and
 receiving different system information through corresponding HARQ processes according to the first configuration information.

According to a second aspect of the embodiments of the present disclosure, a system information sending method is further provided, applied to a transmit side. The method includes:
 determining second configuration information, where the second configuration information is used to indicate HARQ processes for sending different system information; and
 sending different system information through corresponding HARQ processes according to the second configuration information.

According to a third aspect of the embodiments of the present disclosure, a receive side is further provided, including:
 a first determining module, configured to determine first configuration information, where the first configuration information is used to indicate HARQ processes for receiving different system information; and
 a receiving module, configured to receive different system information through corresponding HARQ processes according to the first configuration information.

According to a fourth aspect of the embodiments of the present disclosure, a transmit side is further provided, including:
 a second determining module, configured to determine second configuration information, where the second configuration information is used to indicate HARQ processes for sending different system information; and
 a sending module, configured to send different system information through corresponding HARQ processes according to the second configuration information.

According to a fifth aspect of the embodiments of the present disclosure, a communication device is further provided, including: a processor, a memory, and a program stored in the memory and executable on the processor. The program, when executed by the processor, implements the steps of the system information receiving method or the system information sending method in the first aspect or the second aspect.

According to a sixth aspect of the embodiments of the present disclosure, a non-transitory computer-readable storage medium is further provided. The non-transitory computer-readable storage medium stores a computer program, and the computer program, when executed by a processor, implements the steps of the system information receiving method or the system information sending method in the first aspect or the second aspect.

BRIEF DESCRIPTION OF DRAWINGS

It becomes clear for a person of ordinary skill in the art to learn various other advantages and benefits by reading detailed description of the following optional implementation manners. Accompanying drawings are merely used for showing the optional implementation manners, and are not considered as a limitation on the present disclosure. In all accompanying drawings, a same reference symbol is used to indicate a same part. In the accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The technology described in this specification is not limited to the fifth-generation (5G) system and subsequent evolved communication systems. It is of course understandable that the technology described in this specification can also be applied to various wireless communication systems such as LTE/LTE-advanced (LTE-A) systems, for example, code division multiple access (CDMA), time division multiple access (TDMA), frequency division multiple access (FDMA), orthogonal frequency division multiple access (OFDMA), and single-carrier frequency-division multiple access (SC-FDMA) systems, and other systems.

The terms "system" and "network" are usually used interchangeably. A CDMA system may implement a radio technology such as CDMA2000 or universal terrestrial radio access (UTRA). UTRA includes wideband CDMA (WCDMA) and other CDMA variants. A TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), Institute of Electrical and Electronics Engineers (IEEE) 802.20, and Flash-OFDM. UTRA and E-UTRA are a part of Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3rd Generation Partnership Project, 3GPP). CDMA2000 and UMB are described in a document of an origination named "3rd Generation Partnership Project 2" (3GPP2). The technology described in this specification may also be used in the foregoing system and radio technology, and may also be used in another system and radio technology.

Figure 1:
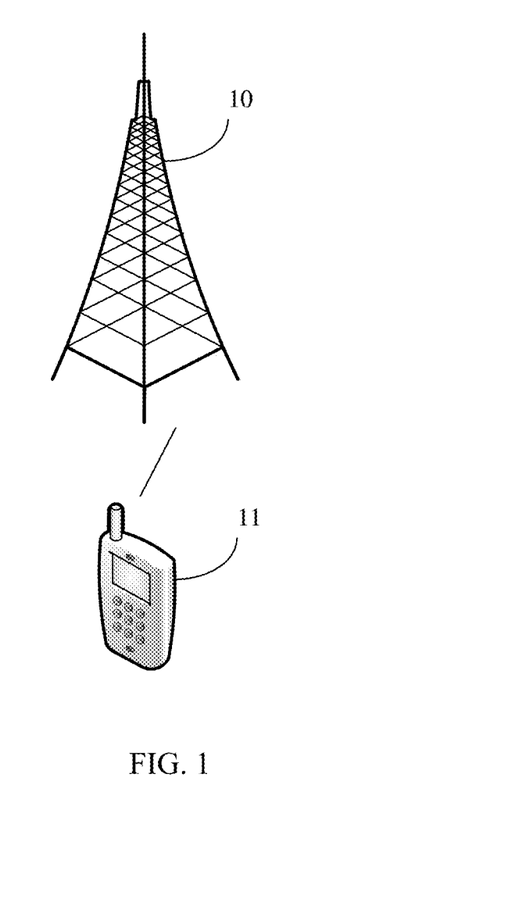
FIG. 1 is a schematic architectural diagram of a wireless communications system according to some embodiments of the present disclosure.

The embodiments of the present disclosure are described below with reference to the accompanying drawings. The system information receiving method, the system information sending method, and the device provided in the embodiments of the present disclosure may be applied to a wireless communications system. FIG. 1 is a schematic architectural diagram of a wireless communications system according to some embodiments of the present disclosure.

As shown in FIG. 1, the wireless communications system may include: a network device 10 and a terminal. The terminal is denoted as user equipment (UE) 11, and the UE 11 may communicate with the network device 10 (transmit signaling or data). In actual application, a connection between the devices is a wireless connection. For ease of visually indicating a connection relationship between the devices, a solid line is used for illustration in FIG. 1. It should be noted that the foregoing communications system can include a plurality of UEs 11, and the network device 10 can communicate with the plurality of UEs 11.

The terminal provided in this embodiment of the present disclosure can be a mobile phone, a tablet computer, a laptop computer, an ultra-mobile personal computer (UMPC), a netbook, or a personal digital assistant (PDA), a mobile Internet device (MID), a wearable device, an in-vehicle device, or the like.

The network device 10 provided in some embodiments of the present disclosure may be a base station, and the base station may be a commonly used base station, or may be an evolved nodeB (eNB), or may be a device such as a network device (for example, a next generation nodeB (gNB) or a transmission and reception point (TRP)) in a 5G system.

Different system information can be sent in different time windows (SI-window). How a terminal can receive different system information at the same time is an urgent problem to be solved.

Figure 2:
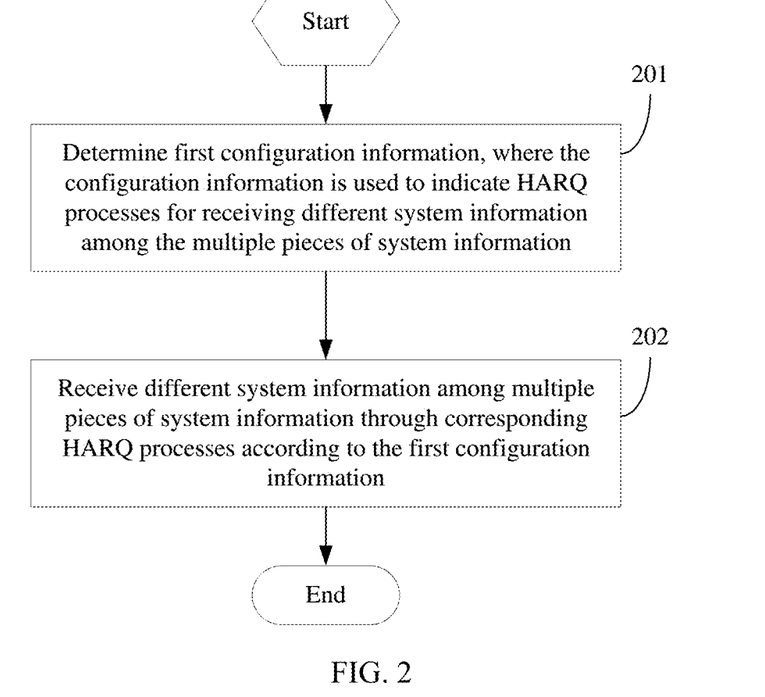
FIG. 2 is a flowchart of a system information receiving method according to some embodiments of the present disclosure.

Referring to FIG. 2, some embodiments of the present disclosure provide a system information receiving method. The method can be performed by a receive side and the receive side can be a terminal or a network device, and steps are as follows.

Step 201: Determine first configuration information, where the first configuration information is used to indicate HARQ processes for receiving different system information among multiple pieces of system information.

Exemplarily, the first configuration information can be configured by a network device, or the first configuration information can be specified by a protocol, or the first configuration information can be obtained in other ways. The configuration method of the first configuration information is not specifically limited in some embodiments of the present disclosure.

In some embodiments of the present disclosure, the receive side can determine, according to the first configuration information, HARQ processes for receiving different system information. The first configuration information can include one or more of the following: a first configuration parameter and a second configuration parameter, the first configuration parameter indicates identifiers of the HARQ processes for receiving different system information among multiple pieces of system information, and the second configuration parameter is used to distinguish (or identify) the HARQ processes for receiving different system information among multiple pieces of system information.

It is understandable that receiving time of the multiple pieces of system information is not completely the same.

In some of the embodiments of the present disclosure, the first configuration parameter may represent any one of the following:

(a) system information among multiple pieces of system information and identifiers of the HARQ processes are in a one-to-one correspondence.

That is, different system information can be received through different HARQ processes.

Figure 3:
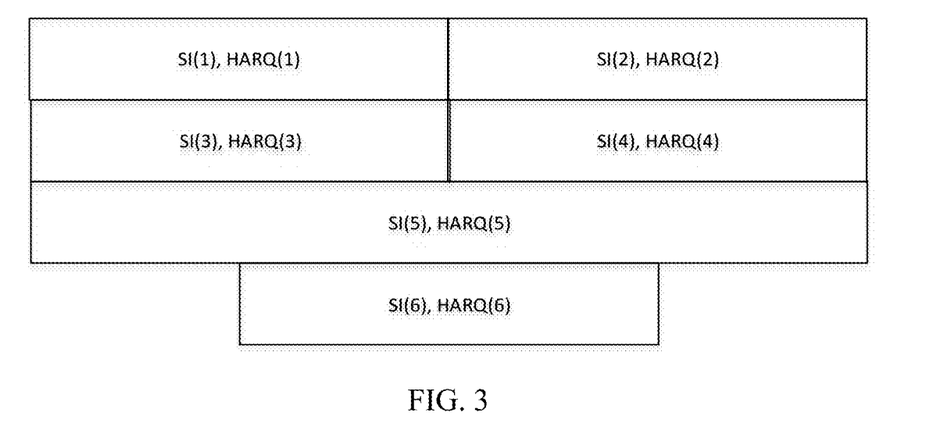
FIG. 3 is a schematic diagram 1 of a first configuration parameter according to some embodiments of the present disclosure.

Referring to FIG. 3, system information 1 (SI (1)) is received through a HARQ process 1 (HARQ (1)) within a receiving time (or called a receiving window); system information 2 (SI (2)) is received through a HARQ process 2 (HARQ (2)) within a receiving time; system information 3 (SI (3)) is received through a HARQ process 3 (HARQ (3)) within a receiving time; system information 4 (SI (4)) is received through a HARQ process 4 (HARQ (4)) within a receiving time; system information 5 (SI (5)) is received through a HARQ process 5 (HARQ (5)) within a receiving time; and system information 6 (SI (6)) is received through a HARQ process 6 (HARQ (6)) within a receiving time.

(b) system information with coinciding receiving time among multiple pieces of system information and the identifiers of the HARQ processes are in a one-to-one correspondence.

That is, the system information with coinciding receiving time can be received through different HARQ processes.

For example: the receiving time of the system information 1 (SI (1)) and the system information 2 (SI (2)) coincide. In this case, the system information 1 (SI (1)) is received through the HARQ process 1 (HARQ (1)) within the receiving time, and the system information 2 (SI (2)) is received through the HARQ process 2 (HARQ (2)) within the receiving time.

(c) system information with non-coinciding receiving time among multiple pieces of system information and the identifiers of the HARQ processes are in a one-to-one correspondence.

That is, the system information with non-coinciding receiving time can be received through different HARQ processes.

For example: the receiving time of the system information 1 (SI (1)) and the system information 2 (SI (2)) do not coincide. In this case, the system information 1 (SI (1)) is received through the HARQ process 1 (HARQ (1)) within the receiving time, and the system information 2 (SI (2)) is received through the HARQ process 2 (HARQ (2)) within the receiving time.

(d) system information with non-coinciding receiving time among multiple pieces of system information corresponds to an identifier of a same HARQ process.

That is, the system information with non-coinciding receiving time can be received through the same HARQ process.

For example: the receiving time of the system information 1 (SI (1)) and the system information 2 (SI (2)) do not coincide. In this case, the system information 1 (SI (1)) is received through the HARQ process 1 (HARQ (1)) within the receiving time, and the system information 2 (SI (2)) is received through the HARQ process 1 (HARQ (1)) within the receiving time.

In the above (b) to (d), the system information with coinciding receiving time can be received through different HARQ processes, and the system information with non-coinciding receiving time can be received through the same HARQ process or different HARQ processes.

Figure 4:
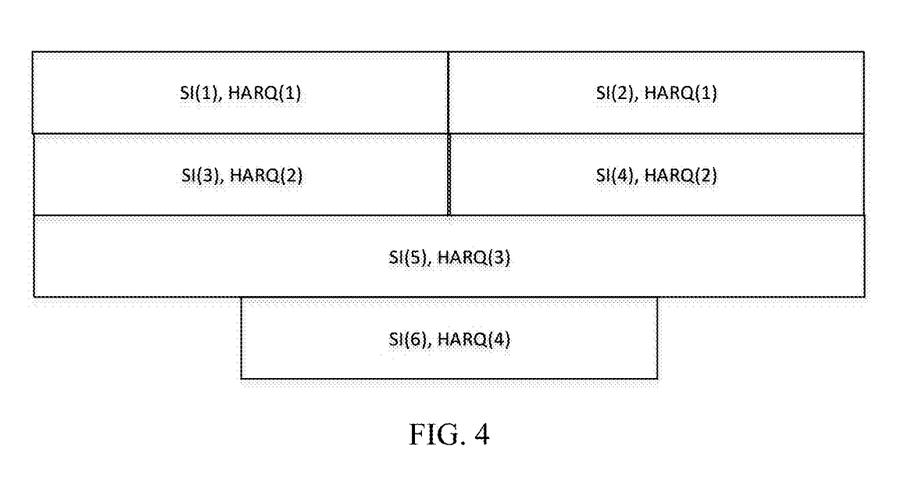
FIG. 4 is a schematic diagram 2 of a first configuration parameter according to some embodiments of the present disclosure.

Referring to FIG. 4, system information 1 (SI (1)) is received through a HARQ process 1 (HARQ (1)) within a receiving time; system information 2 (SI (2)) is received through a HARQ process 1 (HARQ (1)) within a receiving time; system information 3 (SI (3)) is received through a HARQ process 2 (HARQ (2)) within a receiving time; system information 4 (SI (4)) is received through a HARQ process 2 (HARQ (2)) within a receiving time; system information 5 (SI (5)) is received through a HARQ process 3 (HARQ (3)) within a receiving time; and system information 6 (SI (6)) is received through a HARQ process 4 (HARQ (4)) within a receiving time.

It should be noted that the correspondence between the system information and the identifier of the HARQ process shown in FIG. 3 and FIG. 4 is only an example, and the identifier of the HARQ process for receiving the system information is not limited in some embodiments of the present disclosure.

In some embodiments of the present disclosure, optionally, the second configuration parameter can include any one of the following: first information and second information, the first information can be a radio network temporary identifiers (RNTIs), the RNTIs and the HARQ processes are in a one-to-one correspondence, the second information can be first indication information in downlink control information (DCI), the first indication information can implicitly or explicitly indicate a HARQ process, and the HARQ process is used to receive system information for scheduling the DCI.

In some embodiments of the present disclosure, optionally, the first indication information indicates the system information for scheduling the DCI, and the system information for scheduling the DCI and the HARQ processes are in a one-to-one correspondence, or the first indication information indicates the identifier of the HARQ process.

Exemplarily, the configuration manner of the second configuration parameter is as follows:

Manner 1: Different RNTIs are used to distinguish HARQ processes for receiving different system information, for example: RNTI (1) corresponds to the HARQ process 1 (HARQ (1)) for receiving the system information 1, and RNTI (2) corresponds to the HARQ process 2 (HARQ (2)) for receiving the system information 2.

Manner 2: The first indication information is added to the DCI scheduled by the system information, and indicates the system information for scheduling the DCI and implicitly indicates that the system information for scheduling the DCI is received through different HARQ processes. For example: DCI indicates the system information 1 (SI (1)) for scheduling the DCI, and the system information 1 corresponds to the HARQ process 1. In this case, the first indication information implicitly indicates the HARQ process 1, and the HARQ process 1 is used to receive the system information 1 for scheduling the DCI.

Manner 3: The first indication information is added to the DCI scheduled by the system information, and the first indication information indicates the identifier of the HARQ process corresponding to the system information that schedules the DCI. For example, the HARQ process 1 is indicated by the DCI, and the system information that schedules DCI can be received through the HARQ process 1.

In some embodiments of the present disclosure, different RNTIs can be used to distinguish HARQ processes for receiving different system information, or the first indication information is added to the DCI scheduled by the system information to implicitly indicate the HARQ process for receiving the system information by indicate the system information for scheduling the DCI, or the first indication information is added to the DCI scheduled by the system information to indicate identifier of the HARQ process for receiving the system information.

Step 202: Receive different system information among multiple pieces of system information through corresponding HARQ processes according to the first configuration information.

In some embodiments of the present disclosure, the receive side can receive different system information at the same time, and independently process the received different system information, to more reliably and quickly receive multiple pieces of system information.

Figure 5:
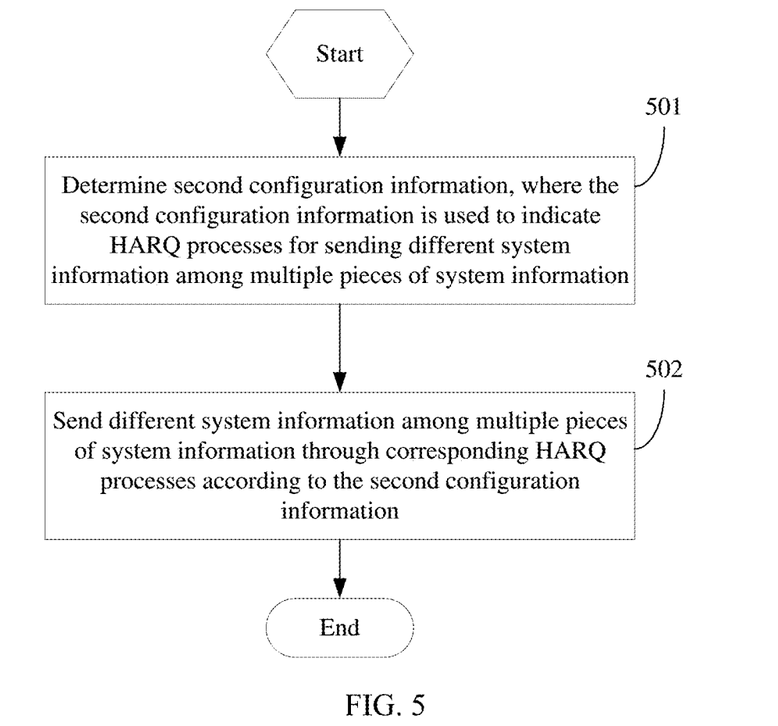
FIG. 5 is a flowchart of a system information sending method according to some embodiments of the present disclosure.

Referring to FIG. 5, some embodiments of the present disclosure further provide a system information sending method. The method is performed by a transmit side and the transmit side can be a network device, and the method includes:

Step 501: Determine second configuration information, where the second configuration information is used to indicate HARQ processes for sending different system information among multiple pieces of system information.

Exemplarily, the second configuration information can be configured by a network side, or the second configuration information can be specified by a protocol, or the second configuration information can be obtained in other ways.

In some embodiments of the present disclosure, the receive side can determine, according to the second configuration information, HARQ processes for receiving different system information. The second configuration information can include one or more of the following: a third configuration parameter and a fourth configuration parameter, the third configuration parameter indicates identifiers of the HARQ processes for sending different system information among multiple pieces of system information, and the fourth configuration parameter is used to distinguish (or identify) the HARQ processes for sending different system information among multiple pieces of system information.

In the embodiments of the present disclosure, the third configuration parameter may represent any one of the following:

(a) system information among multiple pieces of system information and the identifiers of the HARQ processes are in a one-to-one correspondence.

That is, different system information can be sent through different HARQ processes.

Referring to FIG. 3, system information 1 (SI (1)) is sent through a HARQ process 1 (HARQ (1)) within a sending time (or called a sending window); system information 2 (SI (2)) is sent through a HARQ process 2 (HARQ (2)) within a sending time; system information 3 (SI (3)) is sent through a HARQ process 3 (HARQ (3)) within a sending time; system information 4 (SI (4)) is sent through a HARQ process 4 (HARQ (4)) within a sending time; system information 5 (SI (5)) is sent through a HARQ process 5 (HARQ (5)) within a sending time; and system information 6 (SI (6)) is sent through a HARQ process 6 (HARQ (6)) within a sending time.

(b) the system information with coinciding sending times among multiple pieces of system information and the identifiers of the HARQ processes are in a one-to-one correspondence.

That is, the system information with coinciding sending times can be sent through different HARQ processes.

For example: the sending times of the system information 1 (SI (1)) and the system information 2 (SI (2)) coincide. In this case, the system information 1 (SI (1)) is sent through the HARQ process 1 (HARQ (1)) within the sending time, and the system information 2 (SI (2)) is sent through the HARQ process 2 (HARQ (2)) within the sending time.

(c) the system information with non-coinciding sending times among multiple pieces of system information and the identifiers of the HARQ processes are in a one-to-one correspondence.

That is, the system information with non-coinciding sending times can be sent through different HARQ processes.

For example: the sending times of the system information 1 (SI (1)) and the system information 2 (SI (2)) do not coincide. In this case, the system information 1 (SI (1)) is sent through the HARQ process 1 (HARQ (1)) within the sending time, and the system information 2 (SI (2)) is sent through the HARQ process 2 (HARQ (2)) within the sending time.

(d) the system information with non-coinciding sending times among multiple pieces of system information corresponds to an identifier of a same HARQ process.

That is, the system information with non-coinciding sending times can be sent through the same HARQ process.

For example: the sending times of the system information 1 (SI (1)) and the system information 2 (SI (2)) do not coincide. In this case, the system information 1 (SI (1)) is sent through the HARQ process 1 (HARQ (1)) within the sending time, and the system information 2 (SI (2)) is sent through the HARQ process 1 (HARQ (1)) within the sending time.

In the above (b) to (d), the system information with coinciding sending times is sent through different HARQ processes, and the system information with non-coinciding sending times can be sent through the same HARQ process or different HARQ processes.

Referring to FIG. 4, system information 1 (SI (1)) is sent through a HARQ process 1 (HARQ (1)) within a sending time; system information 2 (SI (2)) is sent through a HARQ process 1 (HARQ (1)) within a sending time; system information 3 (SI (3)) is sent through a HARQ process 2 (HARQ (2)) within a sending time; system information 4 (SI (4)) is sent through a HARQ process 2 (HARQ (2)) within a sending time; system information 5 (SI (5)) is sent through a HARQ process 3 (HARQ (3)) within a sending time; and system information 6 (SI (6)) is sent through a HARQ process 4 (HARQ (4)) within a sending time.

It should be noted that the correspondence between the system information and the identifier of the HARQ process shown in FIG. 3 and FIG. 4 is only an example, and the identifier of the HARQ process for sending the system information is not limited in some embodiments of the present disclosure.

In some embodiments of the present disclosure, optionally, the fourth configuration parameter can include any one of the following: third information and fourth information, the third information can be RNTIs, the RNTIs and the HARQ processes are in a one-to-one correspondence, the fourth information can be second indication information in DCI, the second indication information can implicitly or explicitly indicate a HARQ process, and the HARQ process is used to send the system information for scheduling the DCI.

In some embodiments of the present disclosure, optionally, the second indication information indicates the system information for scheduling the DCI, and the system information for scheduling the DCI and the HARQ processes are in a one-to-one correspondence, or the second indication information indicates the identifier of the HARQ process.

Exemplarily, the configuration manner of the fourth configuration parameter is as follows:

Manner 1: Different RNTIs are used to distinguish HARQ processes for sending different system information, for example: RNTI (1) corresponds to the HARQ process 1 (HARQ (1)) for sending the system information 1, and RNTI (2) corresponds to the HARQ process 2 (HARQ (2)) for sending the system information 2.

Manner 2: The second indication information is added to the DCI scheduled by the system information, and indicates the system information for scheduling the DCI and implicitly indicates that the system information for scheduling the DCI is sent in different HARQ processes. For example: DCI indicates the system information 1 (SI (1)) for scheduling the DCI, and the system information 1 corresponds to the HARQ process 1. In this case, the second indication information implicitly indicates the HARQ process 1, and the HARQ process 1 is used to send the system information 1 for scheduling the DCI.

Manner 3: The second indication information is added to the DCI scheduled by the system information, and the second indication information indicates the identifier of the HARQ process corresponding to the system information that schedules the DCI. For example, the HARQ process 1 is indicated by the DCI, and the HARQ process 1 (HARQ (1)) is used to send the system information for scheduling the DCI.

In some embodiments of the present disclosure, different RNTIs can be used to distinguish HARQ processes for sending different system information, or the second indication information is added to the DCI scheduled by the system information to implicitly indicate the HARQ process for sending the system information by indicate the system information for scheduling the DCI, or the second indication information is added to the DCI scheduled by the system information to indicate identifier of the HARQ process for sending the system information.

Step 502: Send different system information among multiple pieces of system information through corresponding HARQ processes according to the second configuration information.

In another embodiment of the present disclosure, the method can also include: sending first configuration information to a receive side, where the first configuration information is used to indicate HARQ processes for receiving different system information among the multiple pieces of system information to the receive side. In this way, the transmit side can configure that the receive side receives different system information among the multiple pieces of system information through corresponding HARQ processes.

In some embodiments of the present disclosure, the receive side can receive different system information at the same time, and independently process the received different system information, to more reliably and quickly receive system information.

Some embodiments of the present disclosure further provide a receive end. A problem resolution principle of the receive side is similar to that of the system information receiving method in some embodiments of the present disclosure. Therefore, for implementation of the receive side, refer to the implementation of the method. Repetitions are not provided herein.

Figure 6:
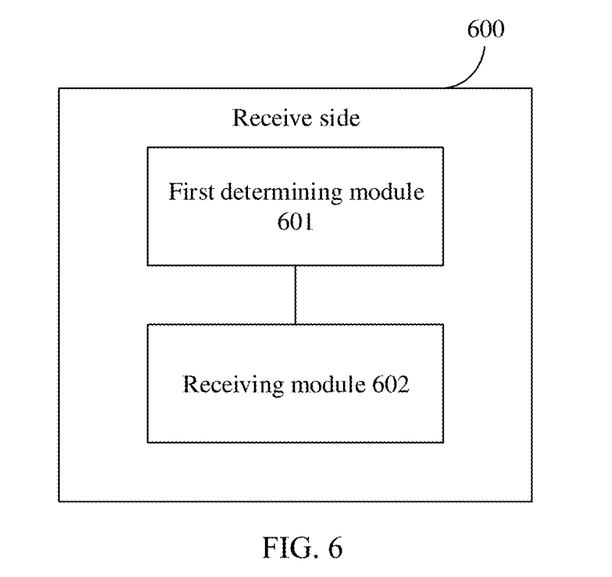
FIG. 6 is a schematic structural diagram of a transmit side according to some embodiments of the present disclosure.

Referring to FIG. 6, an embodiment of the present disclosure further provides a receive side. The receive side 600 includes:
- a first determining module 601, configured to determine first configuration information, where the first configuration information is used to indicate HARQ processes for receiving different system information among the multiple pieces of system information; and
- a receiving module 602, configured to receive different system information among the multiple pieces of system information through corresponding HARQ processes according to the first configuration information.

In some embodiments of the present disclosure, optionally, the first configuration information includes one or more of the following: a first configuration parameter and a second configuration parameter, the first configuration parameter indicates identifiers of the HARQ processes for receiving different system information among the multiple pieces of system information, and the second configuration parameter is used to distinguish the HARQ processes for receiving different system information among the multiple pieces of system information.

In some embodiments of the present disclosure, optionally, the system information among multiple pieces of system information and the identifiers of the HARQ processes are in a one-to-one correspondence, or the system information with coinciding receiving time among multiple pieces of system information and the identifiers of the HARQ processes are in a one-to-one correspondence, or the system information with non-coinciding receiving time among multiple pieces of system information and the identifiers of the HARQ processes are in a one-to-one correspondence, or the system information with non-coinciding receiving time among multiple pieces of system information corresponds to an identifier of a same HARQ process.

In some embodiments of the present disclosure, optionally, the second configuration parameter includes any one of the following: first information and second information, the first information is RNTIs, the RNTIs and the HARQ processes are in a one-to-one correspondence, the second information is first indication information in DCI, the first indication information implicitly or explicitly indicates the HARQ process, and the HARQ process is used to receive the system information for scheduling the DCI.

In some embodiments of the present disclosure, optionally, the first indication information indicates the system information for scheduling the DCI, and the system information for scheduling the DCI and the HARQ processes are in a one-to-one correspondence, or the first indication information indicates the identifier of the HARQ process.

In the embodiments of the present disclosure, optionally, the first configuration information is configured by a network side or specified by a protocol.

The receive side provided in some embodiments of the present disclosure may perform the foregoing method embodiment. An implementation principle and a technical effect thereof are similar thereto, and details are not described herein in this embodiment.

Some embodiments of the present disclosure further provide a transmit side. A problem resolution principle of the transmit side is similar to that of the system information sending method in some embodiments of the present disclosure. Therefore, for implementation of the transmit side, refer to the implementation of the method. Repetitions are not provided herein.

Figure 7:
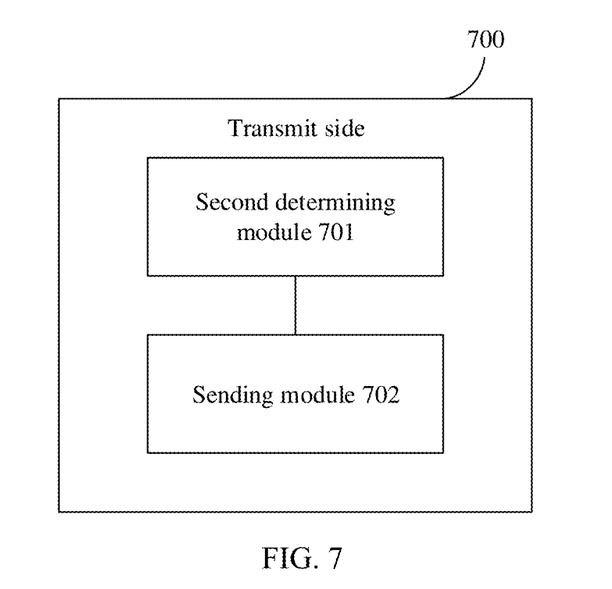
FIG. 7 is a schematic structural diagram of a receive side according to some embodiments of the present disclosure.

Referring to FIG. 7, some embodiments of the present disclosure further provide a transmit side. The transmit side 700 includes:
- a second determining module 701, configured to determine second configuration information, where the second configuration information is used to indicate HARQ processes for sending different system information among multiple pieces of system information; and
- a sending module 702, configured to send different system information among multiple pieces of system information through corresponding HARQ processes according to the second configuration information.

In some embodiments of the present disclosure, optionally, the second configuration information includes one or more of the following: a third configuration parameter and a fourth configuration parameter, the third configuration parameter indicates identifiers of the HARQ processes for sending different system information among multiple pieces of system information, and the fourth configuration parameter is used to distinguish the HARQ processes for sending different system information among multiple pieces of system information.

In some embodiments of the present disclosure, optionally, the system information among multiple pieces of system information and the identifiers of the HARQ processes are in a one-to-one correspondence, or the system information with coinciding sending times among multiple pieces of system information and the identifiers of the HARQ processes are in a one-to-one correspondence, or the system information with non-coinciding sending times among multiple pieces of system information and the identifiers of the HARQ processes are in a one-to-one correspondence, or the system information with non-coinciding sending times among multiple pieces of system information corresponds to an identifier of a same HARQ process.

In some embodiments of the present disclosure, optionally, the fourth configuration parameter includes any one of the following: third information and fourth information, the third information is RNTIs, the RNTIs and the HARQ processes are in a one-to-one correspondence, the fourth information is second indication information in DCI, the second indication information implicitly or explicitly indicates the HARQ process, and the HARQ process is used to send the system information for scheduling the DCI.

In some embodiments of the present disclosure, optionally, the second indication information indicates the system information for scheduling the DCI, and the system information for scheduling the DCI and the HARQ processes are in a one-to-one correspondence, or the second indication information indicates the identifier of the HARQ process.

In some embodiments of the present disclosure, optionally, the second configuration information is specified by a protocol.

In some embodiments of the present disclosure, optionally, the sending module 702 is also configured to: send first configuration information to a receive side, where the first configuration information is used to indicate HARQ processes for receiving different system information among the multiple pieces of system information to the receive side. In this way, the transmit side can configure that the receive side receives different system information among the multiple pieces of system information through corresponding HARQ processes.

The transmit side provided in some embodiments of the present disclosure may perform the foregoing method embodiment. An implementation principle and a technical effect of the terminal are similar thereto, and details are not described herein in this embodiment.

Figure 8:
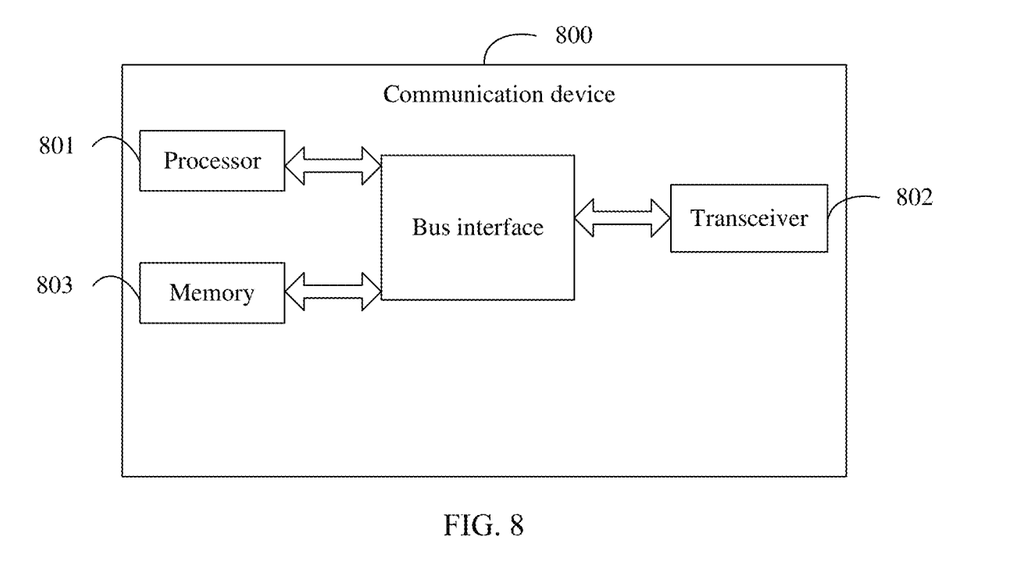
FIG. 8 is a schematic structural diagram of a communication device according to some embodiments of the present disclosure.

Referring to FIG. 8, FIG. 8 is a structural diagram of a communication device applied in some embodiments of the present disclosure. As shown in FIG. 8, the communication device 800 includes: a processor 801, a transceiver 802, a memory 803, and a bus interface.

In an embodiment of the present disclosure, the communication device 800 further includes: a program stored in the memory 803 and executable on the processor 801. The program, when executed by the processor 801, performs the following steps: determining first configuration information, where the first configuration information is used to indicate HARQ processes for receiving different system information among the multiple pieces of system information; and receiving different system information among the multiple pieces of system information through corresponding HARQ processes according to the first configuration information.

In another embodiment of the present disclosure, the network device 800 further includes: a program stored in the memory 803 and executable on the processor 801. The program, when executed by the processor 801, performs the following steps: determining second configuration information, where the second configuration information is used to indicate HARQ processes for receiving different system information among the multiple pieces of system information to the receive side; and sending different system information among multiple pieces of system information to the receive side through corresponding HARQ processes according to the second configuration information.

In FIG. 8, the bus architecture may include any quantity of interconnected buses and bridges, which are specifically connected together by various circuits of one or more processors represented by the processor 801 and a memory represented by the memory 803. The bus architecture may further link various other circuits such as a peripheral device, a voltage regulator, and a power management circuit together. These are all well-known in the art, and therefore are not further described in this specification. The bus interface provides an interface. The transceiver 802 may include a plurality of elements, that is, include a transmitter and a receiver, and provide units for communication with various other apparatuses on a transmission medium.

The processor 801 is responsible for managing the bus architecture and common processing, and the memory 803 may store data used when the processor 801 performs an operation.

The communication device provided in some embodiments of the present disclosure may perform the foregoing method embodiment. An implementation principle and a technical effect thereof are similar, and details are not described again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may take the form of a hardware only embodiment, a software only embodiment, or an embodiment with both software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer readable storage medium. Based on this understanding, the essence of the technical solutions of this disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

Those of ordinary skill in the art can understand that some or all processes of the realization of the foregoing method in the embodiments can be implemented by controlling relevant hardware by the computer program. The foregoing program may be stored on a computer readable storage medium, where when the program is executed, the processes of the embodiments of the foregoing methods can be included. The foregoing storage medium may include: a magnetic disk, an optical disc, a read-only memory (ROM), a random access memory (RAM), or the like.

It can be understood that those embodiments described in the embodiments of the present disclosure can be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a non-transitory computer-readable memory that can instruct a computer or another programmable data processing device to work in a specific manner, so that an instruction stored in the non-transitory computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A system information receiving method, applied to a receive side and comprising:
    determining first configuration information, wherein the first configuration information is used to indicate hybrid automatic repeat request (HARQ) processes for receiving different system information; and
    receiving different system information through corresponding HARQ processes according to the first configuration information; wherein
    the first configuration information comprises one or more of: a first configuration parameter and a second configuration parameter, the first configuration parameter indicates identifiers of the HARQ processes for receiving different system information, and the second configuration parameter is used to distinguish the HARQ processes for receiving different system information.

2. The method according to claim 1, wherein
    system information and the identifiers of the HARQ processes are in a one-to-one correspondence; or
    system information with coinciding receiving time and the identifiers of the HARQ processes are in a one-to-one correspondence; or
    system information with non-coinciding receiving time and the identifiers of the HARQ processes are in a one-to-one correspondence; or
    system information with non-coinciding receiving time corresponds to an identifier of a same HARQ process.

3. The method according to claim 1, wherein the second configuration parameter comprises any one of: first information and second information, the first information is a radio network temporary identifiers (RNTIs), the RNTIs and the HARQ processes are in a one-to-one correspondence, the second information is first indication information in downlink control information (DCI), the first indication information implicitly or explicitly indicates a HARQ process, and the HARQ process is used to receive system information for scheduling the DCI.

4. The method according to claim 3, wherein the first indication information indicates the system information for scheduling the DCI, and the system information and the HARQ processes are in a one-to-one correspondence, or the first indication information indicates the identifier of the HARQ process.

5. The method according to claim 1, wherein the first configuration information is configured by a network side or specified by a protocol.

6. A system information sending method, applied to a transmit side and comprising:
    determining second configuration information, wherein the second configuration information is used to indicate hybrid automatic repeat request (HARQ) processes for sending different system information; and
    sending different system information through corresponding HARQ processes according to the second configuration information; wherein
    the second configuration information comprises one or more of: a third configuration parameter and a fourth configuration parameter, the third configuration parameter indicates identifiers of the HARQ processes for sending different system information, and the fourth configuration parameter is used to distinguish the HARQ processes for sending different system information.

7. The method according to claim 6, wherein
    system information and the identifiers of the HARQ processes are in a one-to-one correspondence; or
    system information with coinciding sending times and the identifiers of the HARQ processes are in a one-to-one correspondence; or
    system information with non-coinciding sending times and the identifiers of the HARQ processes are in a one-to-one correspondence; or
    system information with non-coinciding sending times corresponds to an identifier of a same HARQ process.

8. The method according to claim 6, wherein the fourth configuration parameter comprises any one of: third information and fourth information, the third information is a radio network temporary identifiers (RNTIs), the RNTIs and the HARQ processes are in a one-to-one correspondence, the fourth information is second indication information in downlink control information (DCI), the second indication information implicitly or explicitly indicates a HARQ process, and the HARQ process is used to send system information for scheduling the DCI.

9. The method according to claim 8, wherein the second indication information indicates the system information for scheduling the DCI, and the system information and the HARQ processes are in a one-to-one correspondence, or the second indication information indicates the identifier of the HARQ process.

10. The method according to claim 6, wherein the second configuration information is specified by a protocol.

11. The method according to claim 6, further comprising:
    sending first configuration information to a receive side, wherein the first configuration information is used to indicate HARQ processes for receiving different system information to the receive side.

12. A communications device, comprising: a processor, a memory, and a program stored in the memory and executable on the processor, wherein the program, when executed by the processor, causes the communications device to implements:
    determining first configuration information, wherein the first configuration information is used to indicate hybrid automatic repeat request (HARQ) processes for receiving different system information; and
    receiving different system information through corresponding HARQ processes according to the first configuration information; wherein
    the first configuration information comprises one or more of: a first configuration parameter and a second configuration parameter, the first configuration parameter indicates identifiers of the HARQ processes for receiving different system information, and the second configuration parameter is used to distinguish the HARQ processes for receiving different system information.

13. The communications device according to claim 12, wherein
   system information and the identifiers of the HARQ processes are in a one-to-one correspondence; or
   system information with coinciding receiving time and the identifiers of the HARQ processes are in a one-to-one correspondence; or
   system information with non-coinciding receiving time and the identifiers of the HARQ processes are in a one-to-one correspondence; or
   system information with non-coinciding receiving time corresponds to an identifier of a same HARQ process.

14. The communications device according to claim 12, wherein the second configuration parameter comprises any one of: first information and second information, the first information is a radio network temporary identifiers (RNTIs), the RNTIs and the HARQ processes are in a one-to-one correspondence, the second information is first indication information in downlink control information (DCI), the first indication information implicitly or explicitly indicates a HARQ process, and the HARQ process is used to receive system information for scheduling the DCI.

15. A communications device, comprising: a processor, a memory, and a program stored in the memory and executable on the processor, wherein when the program executed by the processor, causes the communications device to perform steps of the system information sending method according to claim 6.

16. A non-transitory computer-readable storage medium, wherein the non-transitory computer-readable storage medium stores a computer program, and when the computer program executed by a processor, causes the processor to perform steps of the system information receiving method according to claim 1.

17. A non-transitory computer-readable storage medium, wherein the non-transitory computer-readable storage medium stores a computer program, and when the computer program executed by a processor, causes the processor to perform steps of the system information sending method according to claim 6.

18. The communications device according to claim 14, wherein the first indication information indicates the system information for scheduling the DCI, and the system information and the HARQ processes are in a one-to-one correspondence, or the first indication information indicates the identifier of the HARQ process.

19. The communications device according to claim 12, wherein the first configuration information is configured by a network side or specified by a protocol.

* * * * *